(12) United States Patent
Seppä et al.

(10) Patent No.: US 8,063,369 B2
(45) Date of Patent: Nov. 22, 2011

(54) BOLOMETER ELEMENT, BOLOMETER CELL, BOLOMETER CAMERA AND METHOD

(75) Inventors: Heikki Seppä, Helsinki (FI); Panu Helistö, Espoo (FI); Arttu Luukanen, Helsinki (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 931 days.

(21) Appl. No.: 12/071,058

(22) Filed: Feb. 14, 2008

(65) Prior Publication Data

US 2011/0254959 A1 Oct. 20, 2011

(30) Foreign Application Priority Data

Feb. 16, 2007 (FI) .................................... 20075109

(51) Int. Cl.
*G01J 5/00* (2006.01)
(52) U.S. Cl. ................................... 250/338.1
(58) Field of Classification Search .......... 250/330–335, 250/336.1–336.2, 338.1–338.5, 339.01–339.15, 250/340, 341.1–341.8
See application file for complete search history.

(56) References Cited

U.S. PATENT DOCUMENTS

| | | | |
|---|---|---|---|
| 6,048,092 A * | 4/2000 | Kimura et al. | 374/129 |
| 6,953,932 B2 * | 10/2005 | Anderson et al. | 250/338.1 |
| 2006/0231760 A1 * | 10/2006 | Lee et al. | 250/338.1 |

FOREIGN PATENT DOCUMENTS

WO WO-2006/120290 A1 11/2006

OTHER PUBLICATIONS

Foote et al., "Transition edge YBa2Cu3O7-x microbolometers for infrared staring arrays," 1994, SPIE Proceedings, vol. 2159, pp. 2-9.*
Penttila et al., "Development of SQUID Amplifier and AC-biased Bolometer for Detection of Sub-mm Radiation," pp. 139-142, XP-002482392, 2004.
Penttila et al., "Low-noise readout of superconducting bolometers based on electrothermal feedback," Supercond. Sci. Technol., vol. 19, (2006), pp. 319-322.
Kiviranta et al., "A post-SQUID ac amplifier aimed for multiplexed detector readouts," Supercond. Sci. Technol., vol. 19, (2006), pp. S371-S375, XP-002482393.

* cited by examiner

*Primary Examiner* — Kiho Kim
(74) *Attorney, Agent, or Firm* — Birch, Stewart, Kolasch & Birch, LLP

(57) ABSTRACT

The invention relates to a bolometer element, a bolometer cell, a bolometer camera, and a method for reading a bolometer cell. The bolometer cell comprises several bolometer elements. Each bolometer element comprises a first bolometer having a first heating resistance for sensing radiation power acting on the element, and a second bolometer having a second heating resistance, and in each bolometer element the first and second bolometers are electrically connected to each other in such a way that the heating resistance (611) of the first bolometer can be biased with the aid of a voltage through the heating resistance of the second bolometer in order to amplify the radiation power detected with the aid of the connection. With the aid of the invention, it is possible to implement an extremely sensitive bolometer camera.

38 Claims, 5 Drawing Sheets

Figure 1:
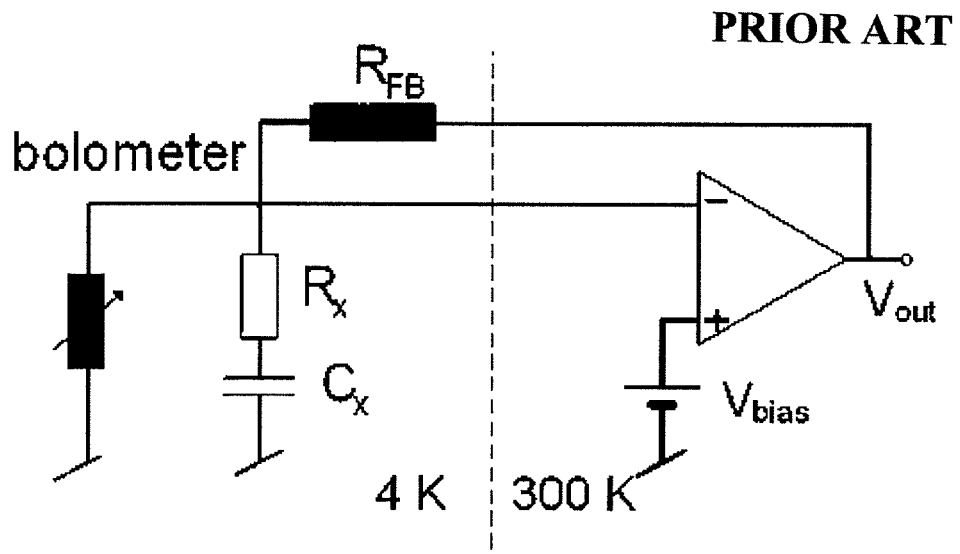

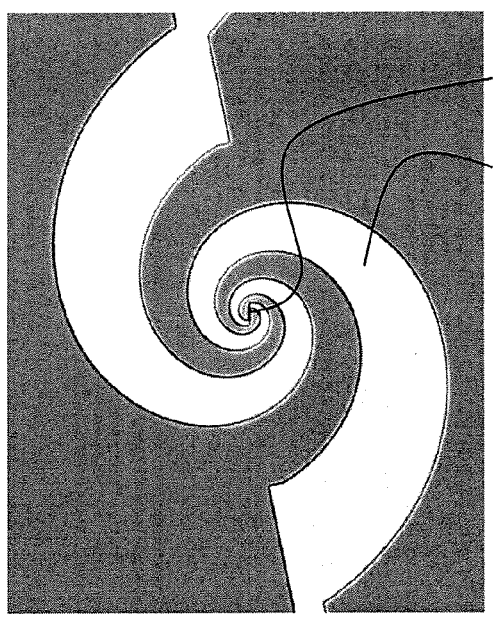
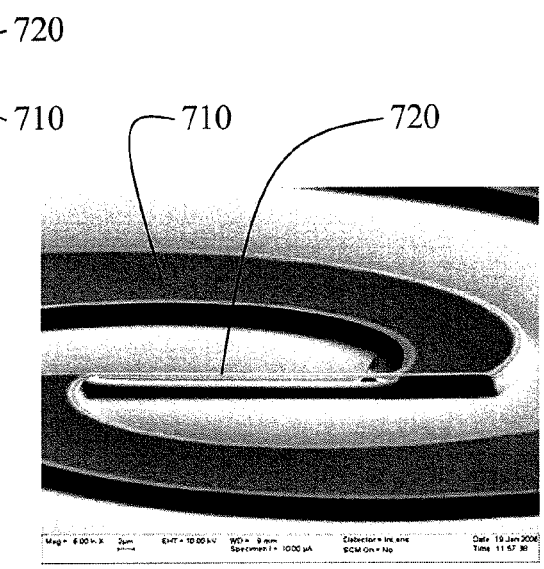
Fig. 7a                    Fig. 7b

BOLOMETER ELEMENT, BOLOMETER CELL, BOLOMETER CAMERA AND METHOD

The invention relates bolometers. In particular, the element relates to bolometer sensor elements and cells, which comprise several bolometer elements is a one or two-dimensional matrix, as well as to bolometer cameras, which comprise such a cell. The invention also relates to a method for reading a bolometric cell.

Bolometers and micro-calorimeters are based on the measurement of radiation power, an electromagnetic quantum, the energy of a particle, or the power relating to a particle flow, by measuring the rise in temperature of a sensor's electron gas or grid. The increase in temperature is detected in a bolometric element as a change in the electro-physical properties of the sensor element. Superconductivity can be used for implementing a bolometer or micro-calorimeter, for instance, by biassing a superconducting element to be very close to the transition temperature. Superconducting bolometers of this kind are referred to as transition-edge superconducting (TES) bolometers. When operating above the transition temperature, the resistance depends very strongly on the temperature while correspondingly when operating below the transition temperature the inductance depends on the temperature.

Superconducting bolometers can be exploited to manufacture extremely sensitive and broadband radiation-power detectors. These can be applied to measuring the energy of an individual quantum in the x-ray range, or to measuring an energy quantum, or especially as a broadband power detector in the millimeter and sub-millimeter ranges.

A traditional superconducting bolometer element has a very simple construction, so that it is relatively easy to manufacture a single detector, while even an entire cell with several elements can be manufactured reasonably easily. This is because a single element contains only a sensor (antenna) and, at its simplest, a short thermally insulated conductor. A problem that arises in superconducting bolometers is measuring the weak output signal without increasing noise. Traditionally, superconducting transition-edge bolometers have been voltage-biased, so that negative thermal feedback reduces the output current. When using bolometers or micro-calorimeters in camera applications, i.e. when using several two-dimensional cells containing sensor elements, a central problem that arises is reading the separate elements, without deterioration of the signal-to-noise ratio. On the other hand, the electronics and wiring become extremely complicated.

Arrangements are also known, in which the bolometer is first set to a positive thermal feedback, in order to amplify the signal. The system is stabilized by using an amplifier at room temperature to force the bolometer to become voltage-biased, through which the entire system can be stabilized. The necessary electronics are relatively simple and suitable for use, if the number of measuring elements is in the order of 100 or less. On the other hand, if the number of elements is great, for example, 100×100 (which can be regarded as a precondition for an effective millimeter camera), it will be nearly impossible to bring a separate room-temperature amplifier to each element, due to the number of conductors required. Of course, it is desirable to reduce the number of conductors even with smaller numbers of pixels.

One known bolometer arrangement is disclosed in the publication J. S. Penttilä, H. Sipola, P. Helistö, and Heikki Seppä, 'Low noise readout of superconducting bolometers based on electrothermal feedback', Superconducting Science and Technology 19, 319-322 (2006). The arrangement is illustrated in FIG. 1, which represents the prior art.

The problem referred to above can be worked around by exploiting multiplexing. Separate switches can be placed in the cell and each pixel can be read separately by exploiting so-called time-multiplexing. However, the signal-noise ratio required from the detectors and the amplifiers connected to their outputs, as well as the necessary filtering (the sampling frequency must be greater than the time constant of the filtering) make time-multiplexing challenging. A particular problem that arises is the power consumption of the switches, as well as the transients caused by them, which appear as a considerable increase in the noise level. For example, in FET switches, a change in the voltage of the grid and channel will cause the charge built up in the capacitance of the grid to discharge into the channel and through it into the measuring circuit.

It is also known to feed different elements at different frequencies and to detect the different frequency signals over a single conductor at room temperature by exploiting mixers, i.e. with the aid of so-called frequency-multiplexing. However, frequency-multiplexing leads to complex electronics, as foldover in the noise must be prevented by bringing a filter to each individual pixel.

The invention is intended to eliminate at least some of the defects of the state of the art described above and for this purpose create a new type of sensitive bolometer suitable for time-multiplexing, as well as a corresponding new method of reading a bolometer permitting a better signal-noise ratio.

In addition, the invention is intended to create a bolometer cell that is more sensitive than known solutions, as well as a new bolometer camera.

The invention is based on the idea of exploiting power amplification of a bolometer when reading the signal. In other words, the bolometer is used not only as a radiation detector, but also as an amplifier. According to the invention, this is achieved by connecting two bolometers in series, in such a way that the thermo-resistive component of the first bolometer can be biased with the aid of a voltage through the heating resistance of the second bolometer. The question is thus not of a pure voltage bias, instead the arrangement described will be referred to hereinafter more briefly as so-called resistance-biasing.

According to a second conceptual model depicting the invention, the invention exploits a bolometer arrangement, in which a physical phenomenon (generally radiation) is detected with the aid of a first thermal effect that it produces and a second thermal effect arising in the measurement of the first thermal effect. Thus, in the proposed bolometer circuit, the secondary heat arising in the reading of the first bolometer is recovered with the aid of the thermal capacity of a second bolometer, so that the increase in temperature in the second bolometer drives the bolometer element into a power-amplifying mode.

We have observed that such a bolometer element is particularly suitable for use in bolometer cells comprising several bolometer elements, which are read with the aid of time-multiplexing. The second bolometer is then exploited as a switch.

Thus, the bolometer element according to the invention comprises a first bolometer, in which there is a first heating resistance for detecting radiation striking the element, and conductors connected to the first bolometer for electrically detecting the radiation directed at the element. According to the invention, the element also comprises a second bolometer, in which there is a second heating resistance, so that the first and second bolometers are connected electrically to each other, in such a way that the heating element of the first bolometer can be biased with the aid of a voltage through the heating resistance of the second bolometer in order to amplify the radiation power detected with the aid of the configuration.

The bolometer cell according to the invention comprises several bolometer elements placed to form a one or two-dimensional matrix, as well as conductors for electrically detecting from each bolometer element radiation striking the bolometer elements. Each bolometer element comprises a first bolometer, in which there is a first heating resistance, for detecting radiation striking the element, and a second heating resistance, in which case in each bolometer element the first and second bolometers are connected electrically to each other, in such a way that the heating resistance of the first bolometer can be biased with the aid of a voltage through the heating resistance of the second bolometer, in order to amplify the radiation power detected in each bolometer element with the aid of the configuration. A cell implemented in this way can be read in such a way that the second bolometer acts as a switch between the elements and the set of time-multiplexing circuits connected to them. Always depending on the type of bolometer, the switch is controlled by regulating the temperature of the second bolometer, or the voltage over it.

The bolometer camera according to the invention comprises a bolometer cell of the type described above.

In the method according to the invention, a bolometer cell of the type described above is read with the aid of time-multiplexing, so that the signal amplified with the aid of a bias voltage is read several columns at a time, element by element, simultaneously through the reading conductors, with the aid of a current amplifier. From each column of the element being read, the second bolometers of the elements are selected row by row, using time-multiplexing, as switches which are opened and closed one by one with the aid of a selection current or selection voltage directed to the row.

According to the invention, the first bolometer acts simultaneously as both a detecting and an amplifying member. Correspondingly, when multiplexing the second bolometer acts simultaneously as a detecting and a connecting element. Always depending on the context, the first bolometer can also be referred to as only a detector bolometer or as a (pre) amplifier bolometer. Typically the second bolometer has additionally an integrating task, i.e. through its time constant it prevents noise foldover in the output of the element. Thus it can also be referred to as an integrating bolometer or a switch bolometer. Corresponding applications will be described later in greater detail.

More specifically, the bolometer according to the invention is characterized by what is stated in the characterizing portion of claim 1. The cell, camera, and method according to the invention are, for their part, characterized by what is stated in the characterizing portions of 9, 20, and 24 respectively.

Considerable advantages are gained with the aid of the invention. At the micro level, the invention is extremely energy efficient, as the increase in temperature arising in reading is exploited to obtain power amplification from the arrangement. This is because we have observed that, with the aid of the resistance biasing according to the invention, the power amplification produced by the first bolometer, and through it the signal-to-noise ratio, can be maximized, particularly when a cell comprising several such resistance-biased elements is read with the aid of time-multiplexing. Resistance biasing causes a rise in temperature to increase the resistance of the bolometer, which in turn reduces the electrical heating. The system thus has negative feedback and is therefore stable.

The negative feedback achieved with the aid of the resistance biasing according to the invention is advantageous, because it permits high power to be used in reading, without the system becoming unstable, and, in addition, increases the dynamic range. With the aid of the invention, it is possible to implement a detector, which has a sensitivity limited essentially by the phonon noise of the detector (and at its most sensitive even by the phonon noise coming from the object being measured), as described in greater detail later. This is because in the present construction multiplexing with the aid of a bias voltage does not introduce substantial new noise to the signal. Thus a very sensitive bolometric imaging instrument (camera) can be manufactured, the operation of which is, however, passive, i.e. it does not require the use of an external source of radiation power.

In particular, the invention permits the manufacture of a sensor with a large number of imaging elements for bolometric imaging devices and applications. The size of the sensor can, however, be kept small and its surface-area efficiency high (dense matrix), as the present new circuit considerably simplifies the reading electronics required, compared to many known solutions. Thus a larger part than previously of the area of the cell is available for detection. The manufacturing process of the cell too can be simplified, as will be described later in great detail. The end product can be a cell comprising hundreds of pixels in two orthogonal directions. Due to its simple construction, a particularly advantageous solution according to the invention is in cells with a number of pixels of at least 100×100, and even at least 400×400, for example, 640×480.

Because power amplification can be obtained from the bolometer, the bolometer can be dimensioned to have a sufficiently long time constant.

In this document, we use the term bolometer to refer to a means, the thermal power absorbed by which can be measured through the detection of a change in the electrical resistance of the means (thermo-resistivity). A bolometer can comprise a separate radiation absorber and a thermometer (generally, a thermo-component) (a so-called composite bolometer), or alternatively the thermometric component can also act as the absorber. The thermal power can be the radiation being detected (esp. the first bolometer), or, for example, produced by an electric current (esp. the second bolometer). The wavelength of the radiation being detected can vary even greatly, though the most sensitive bolometers operate in the sub-millimeter range (most typically $\lambda$=about 200 µm-about 1 nm). In this connection, we regard particle radiation as also being radiation.

In connection with the present invention, bolometers based on superconductors are preferably used, most typically bolometers displaying strong temperature/resistance transitions, such as TES (Transition Edge Sensor) bolometers, superconducting wire bolometers (hot-spot bolometers), and/or bolometers created with the aid of an SIN (Superconductor—Insulator—Normal metal) junction. Their resistance depends steeply on temperature. In connection with them, separate heating resistances can also be arranged, to achieve the desired temperature-dependent configurations for time-multiplexing. Besides bolometers based on super-transition, bolometers displaying other known, or as yet unknown temperature/resistance transitions can be utilized. This will come into question mainly to achieve a bolometer configuration producing power amplification at high temperatures.

It is preferable to use a transition-edge bolometer as the first bolometer, though SIN-junction bolometers can also be used. In both cases, a transition-edge bolometer or SIN junction can also be used as the second bolometer. Two preferred implementations will be described later in greater detail. A bolometer element of this type is cooled when it is used close to the transition temperature of the first bolometer.

It is especially preferable if the resistances of the first and second bolometers are of the same order of magnitude at the operating temperature, or if the resistance value of the second bolometer is slightly, for example, 0.01-50% smaller than the resistance of the first bolometer. This is to ensure that the first bolometer will be stable in all situations, but will, however, have sufficient power amplification. It can be roughly estimated that, for example, a power-amplification factor of about 6 will be obtained using a second bolometer with a resistance about 20% smaller.

The invention and the bolometers according to its embodiments are suitable for use in, for example, remote sensing, studies of planets and the atmosphere, solar research, security checks (the detection of, for instance, hidden firearms and biological and chemical weapons), detecting landmines, as well as in searching for other objects with the aid of thermal radiation, as well as in medicine (for instance, detecting skin cancer).

Figure 2:
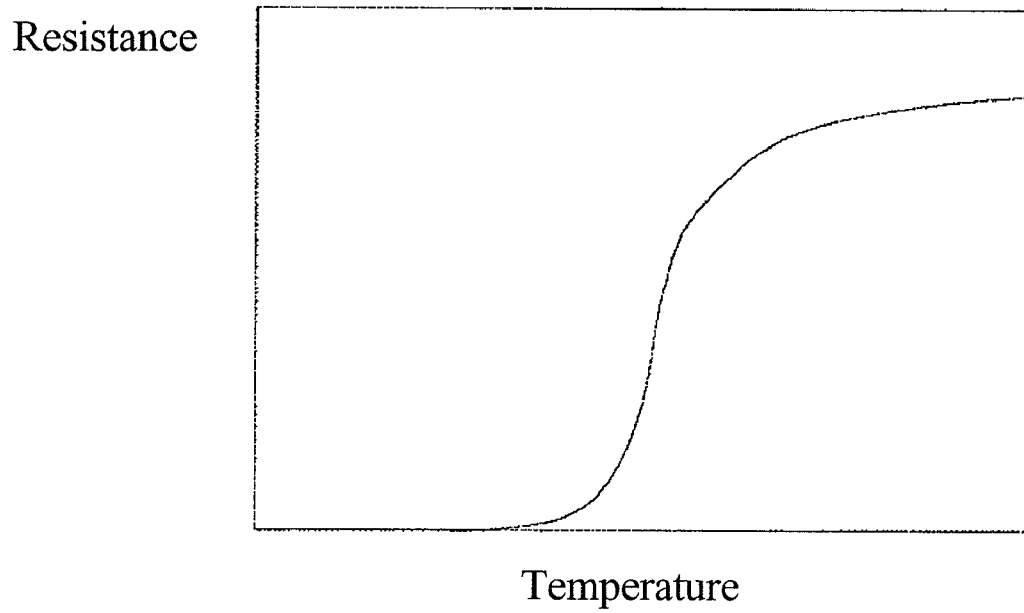
Figure 3:
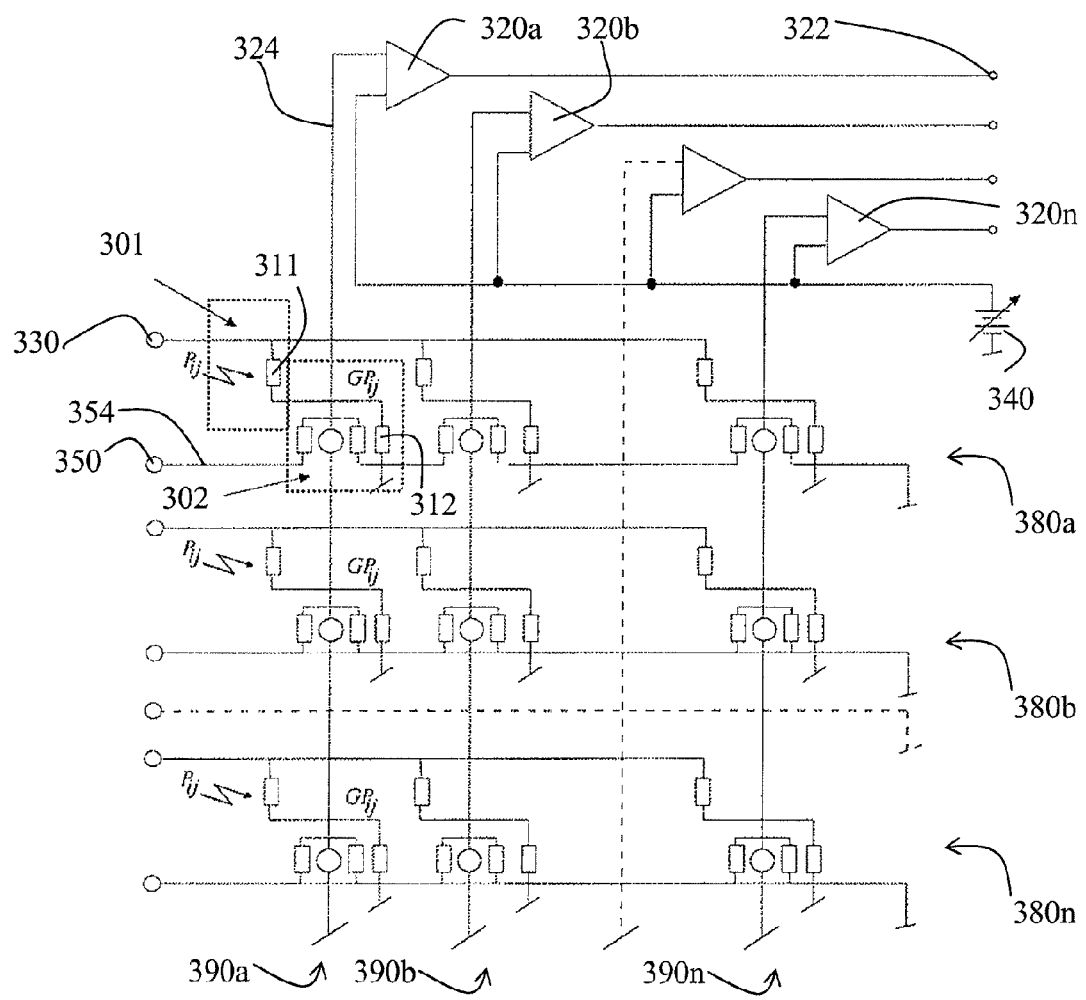
Figure 4:
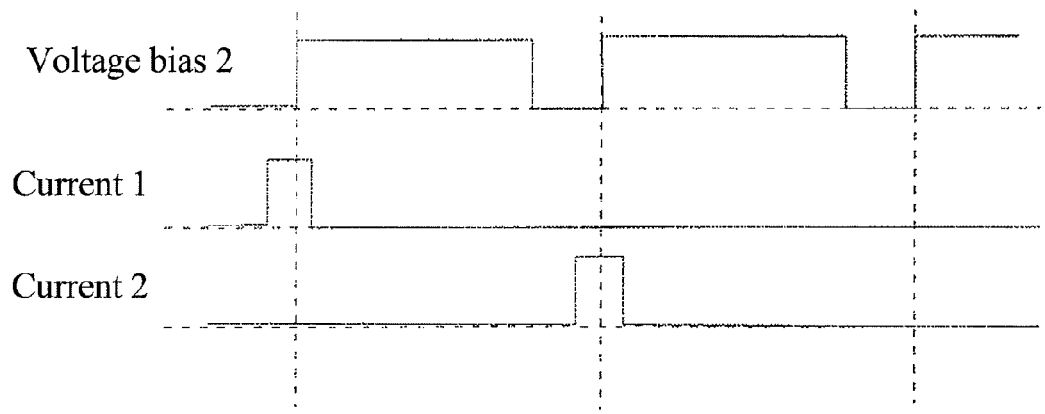
Figure 5:
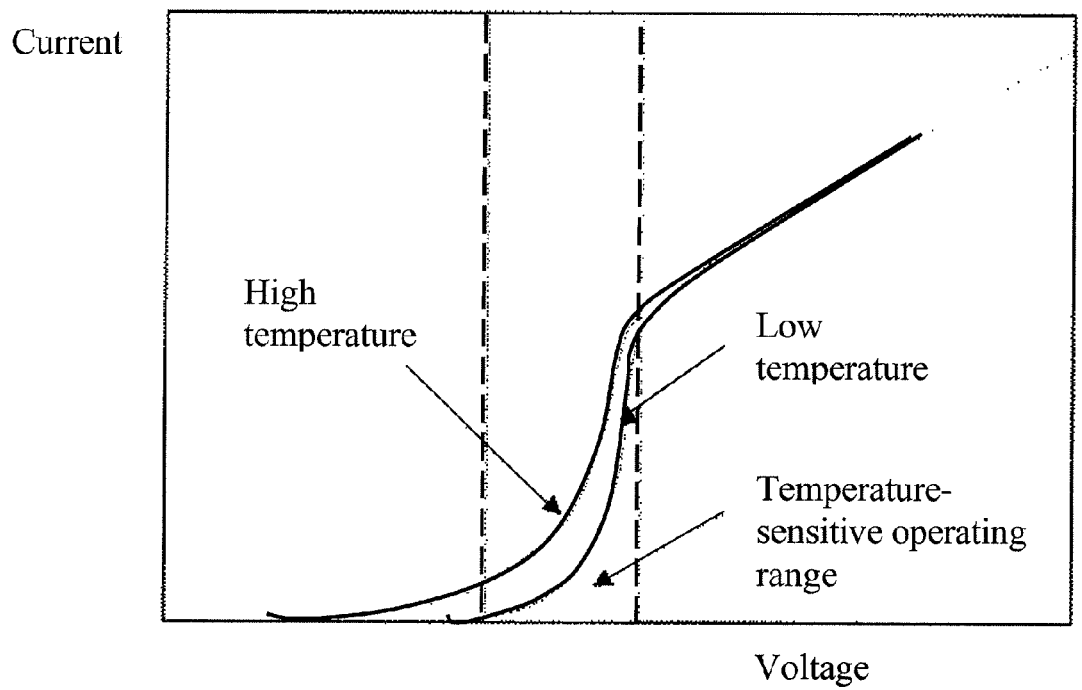
Figure 6:
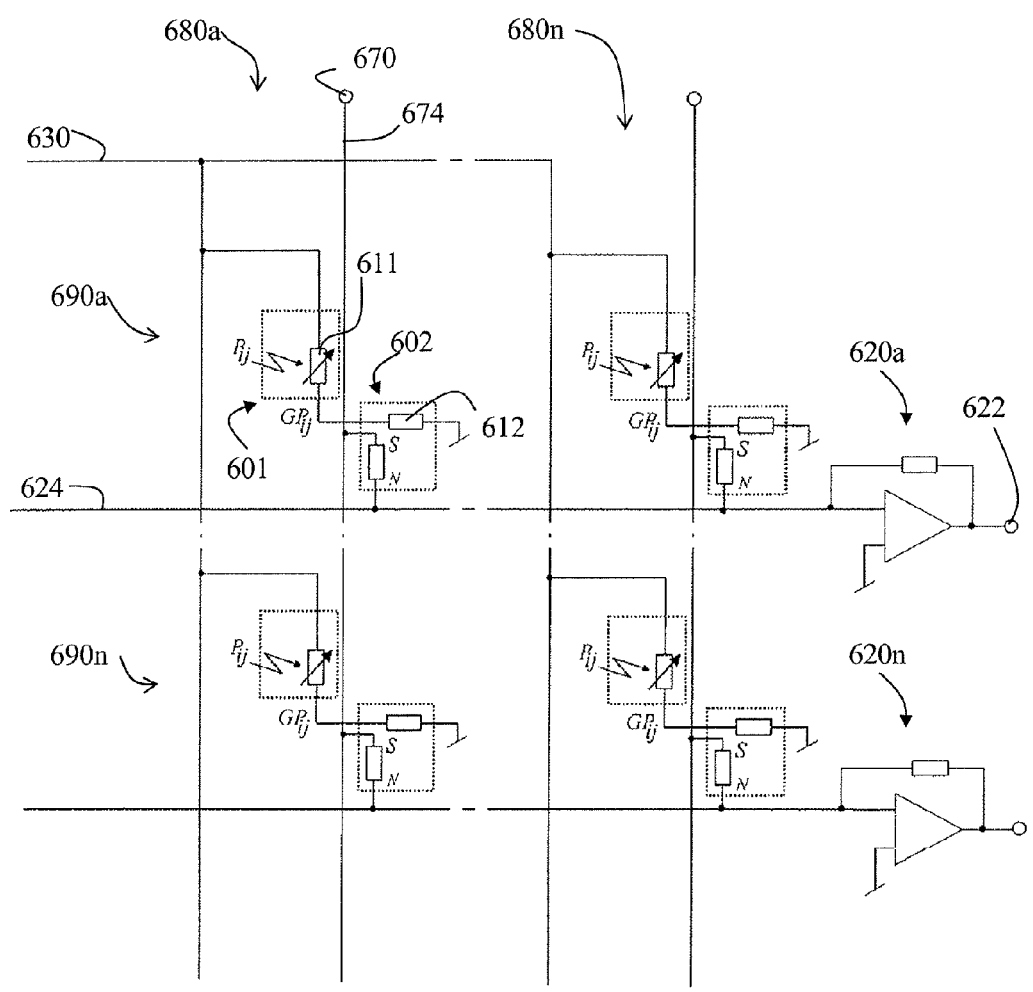

In the following, embodiments of the invention are examined in greater detail with reference to the accompanying drawings, in which FIG. 1 shows a bolometer coupling according to prior art, FIG. 2 shows the temperature-resistance curve of a superconductor, FIG. 3 shows a diagram of a time-multiplexer, in which both bolometers are based on super-transition, FIG. 4 shows an example of a multiplexing sequence relating to FIG. 3, FIG. 5 shows the specific current-voltage curve of a typical SIN junction, FIG. 6 shows a diagram of a time-multiplexer, in which the temperature in the second bolometer is measured exploiting an SIN junction, and FIGS. 7a and 7b show examples of a bolometer antenna circuit in a top view and in a perspective view in two different scales respectively.

The present invention permits applications and further developments on several levels, the most important of which are itemized briefly below and described later in greater detail:

1. Single bolometer element, from which it is possible to obtain power amplification with the aid of resistance biasing, in order to manufacture a more sensitive sensor-construction-element for use in different applications.
2. Linear (one-dimensional) bolometer cell for particular imaging applications.
3. Two-dimensional bolometer cell for camera applications.
4. Operational bolometer camera.
5. Time-multiplexing using simple multiplexing electronics, exploiting the power-amplifying nature and switching property of the bolometer element. Time-multiplexing can be applied to both one and two-dimensional bolometer cells.

The essential idea of the embodiments of the invention disclosed in this document is based on exploiting the bolometer's power amplification. This means that the bolometer element is not used in the traditional manner as only a detector, but that it is also used as an amplifier, with the aid of a series connection of two bolometers and a bias voltage arranged over them. Thus, according to the invention, a thermo-resistive multi-element detector is created, which applies time-plane multiplexing, without this substantially producing the effective noise of a single element, which when implemented in the traditional manner has been difficult, especially in the case of dense cells.

According to one embodiment of the invention, the properties of superconducting edge transition bolometers are exploited to achieve the desired objective. FIG. 2 shows the temperature-resistance curve of a superconductor. The curve is based on the assumption that electrical power does not substantially heat a superconductor when operating in the resistive range. If the element is thermally insulated and biased by current, both the temperature-resistance curve and the current-voltage curve will become hysteretic. This is because the increased current raises the temperature of the bolometer, which in turn increases the resistance, so that power consumption increases. So-called positive feedback takes place and the system becomes unstable. A double-bolometer circuit, which is voltage-biased (i.e. resistance biased) according to the invention, gives the system negative feedback, and thus makes it stable. Thus it permits the use of great power for reading the bolometer.

Two ways to implement a solution based on the power amplification of the bolometer are described below. In the first, both bolometers are based on super transition while in the second of them the first bolometer is based on super transition, but in the second bolometer the increase in temperature is measured utilizing an SIN junction (SIN=Superconductor–Insulator–Normal metal). The first bolometer is designed to produce power amplification, while after it is placed a second bolometer based on either a superconducting transition, or an SIN junction.

In the case of the superconducting transition, multiplexing is based on reading only the bolometer that has been brought by power above the transition, and its measurement current travelling through the other elements by superconduction. In other words, the superconductor of the thermo-component is in a superconducting state at operating temperature, when the bias voltage is switched off, but can be brought to a resistive state with the aid of preheating, i.e. a selection current that connects a bias voltage and heats the bolometer to be switched on during multiplexing.

On the other hand, when using an SIN junction, a voltage is set over the bolometer, so that its current is strongly temperature-dependent and the other bolometers connected to the same amplifier have no voltage and do not create a measurable signal. This is because the voltage is used to bring the SIN junction close to its forbidden range, which permits a current, induced by radiation, to arise over the junction.

FIG. 3 shows a diagram of a multiplexer, in which both bolometers 301, 302 are based on a superconducting transition. The output of the first bolometer 301 is connected to the resistance 312 in the second bolometer 302, in such a way that their resistances 311, 312 are of the same order of magnitude, or the value of the heating resistance 312 of the second bolometer is slightly less than that of the first bolometer 311. This is to ensure that the first bolometer 301 will be stable in all situations, but that its power amplification will nevertheless be sufficiently great. The power-amplifying constant bias voltage is connected from the bias conductor 330, so that it acts over the series resistances 311 and 312. Thus the radiation power $P_{ij}$ received by the element (in this case, the matrix element i, j) is amplified by the factor G.

When multiplexing the circuit according to FIG. 3, the reading-voltage bias 340 is first set to zero, so that all the bolometers are switched to a superconducting state. The desired row 380a, 380b, ... 380n is activated by heating one row with a current bias 350. When the reading-voltage bias 340 is switched on, only the preheated row is driven to the resistive mode and the outputs of the current amplifiers 320a, 320*b*, . . . 320*n* of the columns 390*a*, 390*b*, . . . 390*n* are proportional to the resistance value of the bolometers being read and consequently to the temperature. Because there is power amplification in the first bolometer 301 in such a configuration, and in the second bolometer 302 there is preferably a long time constant, reading can be performed without increasing noise. The second bolometer 302 can be used as a switch in multiplexing, in such a way that the elements (columns) to be read are biased to the transition temperature, the other elements in the series (row) being biased in such a way that they are superconducting. FIG. 4 illustrates an example of a reading sequence for use when reading the circuit according to FIG. 3.

As described above, the selection of the row 380*a*, 380*b*, . . . 390*n* is most typically achieved electrically by means of a separate heater (resistance) thermally connected to the bolometer. Radiant heat can also be used. However, using heat to control a heat-sensitive switch can increase to some extent transients and thus the noise in the final system. To avoid heat noise, the row-selection transition can also be achieved using a magnetic field. In that case, it will be essential to create a sufficiently large magnetic field, so that the selection of the row 380*a*, 380*b*, . . . 380*n* will succeed. Such an application can be implemented by creating the bolometer as a construction comprising two superconducting loops (a primary and a secondary loop), in which case the connection of the magnetic field to the construction will be improved.

Next, the use of a second bolometer based on an SIN junction is described in greater detail. In an SIN junction, the current depends non-linearly on the voltage and is sensitive to temperature, because the tunnelling probability of quasi particles depends strongly on temperature. If the junction is irradiated at a greater frequency that the forbidden band of the superconductor, its operation will change, in such a way that the hot electrons will tunnel over the junction, which can be exploited to achieve the multiplexing according to the invention.

FIG. 6 shows a cell solution, in which a first bolometer 601 (for example, a transition edge bolometer) heats a second bolometer 602, in which the temperature is then measured exploiting an SIN junction. All the detector bolometers 601 are constant-voltage biased through the heating resistances of the second bolometers (resistance biased). The biasing can be performed using direct or alternating voltage. We have been surprised to observe that particularly using such a construction and method based on an SIN junction, large numbers of imaging elements can be read without the noise being substantially increased by the actual multiplexing.

FIG. 5 shows the specific current-voltage curve of a typical SIN junction. Due to the forbidden band of the superconductor, normal electrons will not be able to tunnel over the junction. however, if the voltage is sufficiently large, the biasing will permit tunnelling even at a zero temperature. Thus, again referring to FIG. 6, if the bias 630 is slightly smaller than this limit, the increase in temperature will increase the energy of the electrons and permit tunnelling. The final result is that an SIN junction will be a extremely sensitive thermal sensor, if the bias voltage 630 over it is very close to the energy corresponding to the forbidden band. The same voltage can be set over each element, as the bias required does not depend on the properties of a single SIN junction. On the other hand, if the voltage bias 630 is set to zero (or to be small), the dynamic resistance of the SIN junction will be very great and the current will not depend on the voltage. This permits multiplexing in such a way that the 'inoperative' junctions can be parallel to the junction that are the object of the measurement, without them significantly increasing noise in the reading.

We have particularly observed that it is preferable for the tunnel resistance $R_{SN}$ of the SIN junction to be sufficiently large, or alternatively for several junctions to be placed in series. In that case, the bolometers under zero biasing will not be sensitive to temperature changes, which will an SIN junction to be used in time-multiplexing as an extremely low-noise switch. In other words, the SIN junctions of the bolometer elements that are not read will not heat the circuit, so that with the aid of this embodiment it is possible to substantially reduce the importance of switch transitions in multiplexing. A particular improvement is achieved compared, not only to traditional mechanical switches and FET switches, but also to the double-transition-edge bolometer application based on electrical heating described above.

Close to the threshold voltage of the SIN junction, the noise is determined by the shot noise or the phonon noise, whereas at zero biasing the noise is determined, according to the fluctuation-dissipation theorem, by the dynamic resistance. We have also found surprisingly that the temperature sensitivity of an SIN junction is sufficient for shot noise not to limit its resolution, when using the junction in the present solution as a time-multiplexing switch in the property of the second bolometer.

It can be demonstrated, that thermal noise when using zero biasing is at least $2\exp(-\Delta/k_B T_{SN})$-times smaller than in an energized case, if 4 is the forbidden band of the superconductor, $k_B$ is the Boltzmann constant, and $T_{SN}$ is the temperature of the junction. According to a preferred embodiment, for each amplifier in the cell there are at most $\exp(-\Delta/k_B T_{SN})/2$ parallel SIN junctions, so that the inactive junctions will not significantly increase noise in the reading. Here no account is taken of leakage current possibly appearing in the junction, which can slightly increase the noise caused by individual junctions. In theory, the noise level of the present solution can even increase to some extent compared to traditional time-multiplexing circuits, as the signal too is greater, on account of utilizing the power amplification of the first bolometer.

In particularly the leakage current of inactive junctions can be accepted in cases in which the noise of the active junction is determined by the phonon noise, when the total noise will more easily remain sufficiently small. It can be shown that the ratio of phonon noise S(phonon) to shot noise S(shot noise) is $(R_{TSIN}/2R)\mathrm{sqrt}(\pi k_B T\Delta/2e^2)$, in which $R_{TSIN}$ is the thermal resistance, R the junction resistance, and T the junction temperature. For example, if T=5K, phonon noise will be the determining factor, if the condition $R_{TSIN}$>2500 K/W is met. This is relatively easy to achieve, if the junction resistance is kept relatively low. However, the junction resistance is preferably kept as high as possible, to facilitate adapting the junction to an amplifier at room temperature. On the other hand, it is not wished to increase the thermal resistance excessively, because in that case the electrical power from the first bolometer will heat the resistance to too high a temperature.

If the dynamic resistance of the SIN junction being used is very small close to the threshold voltage, the junctions can be placed in series to increase the dynamic impedance. Alternatively, thermal feedback can be used, or it can be biased to slightly below the threshold voltage, to increase the impedance level of the junction. These alternatives can be used particularly if the source of the dominating noise of an individual junction is phonon noise, or if the power amplification of the first bolometer is great.

Further, the 1/f noise of the SIN junctions can also be eliminated, in such a way that the alternating voltage is switched off for a short time, to calibrate the operating point of the SIN junctions. Reading the SIN junctions takes place simply by connecting voltage to one row across the junctions, while all the other rows are de-energized. Thus, the output of their current amplifiers will be directly proportional to the temperature of each SIN junction.

It should be noted that thermal feedback can also appear in an SIN junction, in the same way as in a transition-edge bolometer, if the power used and the thermal resistance relative to the environment are sufficiently great. Thus in some arrangements an SIN junction instead of a transition-edge bolometer can be used as the first bolometer.

Low or high-temperature superconductors can be used as the superconductors of TES and SIN bolometers. If it is possible to develop bolometers with a sufficiently high sensitivity for high temperatures, and, for example, a diode is used as an integrating bolometer, it will be possible to implement the bolometer and multiplexing according to the invention also at the highest temperatures, even at room temperature. In that case, the imaging will be directed preferably to the highest frequencies, such as the visible-light range, when considering dark-vision devices, for example.

In order to achieve the best reading, the first bolometer is optimized in the sense of Terahertz power matching as well as thermal isolation. Particularly for Terahertz-range space research, the sensitivity of the cell can be increased by cooling it to a temperature of less than 1 K.

The following is an examination in greater detail of time-multiplexing according to the invention in the case of the cell constructions described above (FIGS. 3 and 6). The cells are generally formed in the shape of two-dimensional orthogonal grids, in such a way that in them there are rows $380x$, $680x$ and columns $390x$, $690x$ (x=a . . . n). A reading conductor 324, 624, which is connected to an amplifier $320x$, $620x$, is coupled with each column $380x$, $390x$. Coupled with each row, on the other hand, is a row-selection conductor 354, 674, which travels from element to element in a line at essentially right angles to the reading conductor 324, 624. Thus low-noise time-multiplexing is achieved in the manner described here, in such a way that the second bolometer 302, 602 is connected to the first bolometer 301, 601 and the reading circuits, in such a way that it can be used as a detector and switch at the same time. In the case in the example, the increase in the temperature (TES) or voltage (SIN) of the second bolometers created by the bias voltage and selection current (TES) or the selection voltage (SIN) is exploited. Thus a TES bolometer is generally connected in series to the row-selection conductor 354, 674 and the SIN bolometers are connected in parallel. One skilled in the art will understand that the same principle can also be applied in other constructions that can be envisaged within the scope of the invention, in which an electrothermal transition can be detected in the second bolometer, so that it can be used as a switch controlled electrically, magnetically, or with the aid of radiation. Due to the low noise level caused by the strength and reduced temperature of the super-transition, superconducting bolometers are, however, more economical at present. Compared to a multiplexer implemented using separate switches, which considerably increases power consumption and noise through the switch transitions, the present method and circuits are considerably more economical in this sense.

More specifically, if the second bolometers are transition-edge bolometers or of a similar type, their heating resistances are connected in series by rows, in which case the elements being read are selected by heating the transition-edge bolometers of the row in question with the aid of a selection current, so that they change from a superconducting state to a resistive state, when the radiation focussed on the corresponding elements can be detected with the aid of the amplifiers from only the elements thus selected.

If, on the other hand, the second bolometer comprises an SIN junction or similar, it is connected by rows in parallel with the row-selection conductor, in which case the elements being read are selected by bringing their SIN junctions close to their forbidden band with the aid of the selection voltage, so that the radiation focussed on the corresponding elements can be detected with the aid of the amplifiers from only the elements thus selected.

In summary, it can be stated that, in the manner described above, the transition point (transition range) of the second bolometer can be exploited, not only by connecting it thermally to a second heating resistance, in which case its temperature can be regulated with the aid of the current travelling through the second heating resistance, but also in such a way that its sensitivity to the radiation being detected depends on the heating current (TES bolometer) or voltage (SIN bolometer) over the bolometer. Stated generally, in both of the embodiments depicted, an increase in the energy state, i.e. temperature (magnetic field) (TES) or voltage (SIN), of the second bolometer, created by the bias voltage and selection current (/-radiation/-magnetic field) (TEST) or the selection voltage (SIN) is exploited when reading the cell.

The configuration described allows the signal to be effectively amplified before multiplexing and, in addition, the signal of an individual element to be effectively low-pass filtered when the sampling frequency is greater than the limit frequency of the filter. After the time-multiplexing circuit, the signal can be amplified using a low-noise amplifier. The effective noise of an amplifier of this kind, reduced in the input (i.e. taking into account the amplification of the amplifier placed in the element or after it), is less than the square root of the ratio of the measurement time of one element to the measurement time times the noise in the output of the second bolometer.

According to one embodiment, bolometers with a long thermal time constant are used as the second bolometer. To achieve this, the time constant of the second bolometer is set to be sufficiently long by exploiting its thermal mass. This achieves the advantage that the time constant of the second bolometer acts like an integrator in the circuit and thus prevents noise foldover, which helps to improve the signal-noise ratio achieved.

The present solution is particularly suitable for cells, in which there are at least 50 and typically at least 100 parallel pixels/amplifier read with the aid of time-multiplexing. We have demonstrated that the parallel connection of even one hundred resistance-biassed bolometers based on an SIN junction will not significantly increase noise in the output of the circuit. Thus the solution peinhits the manufacture of a complete camera based on time-limited multiplexing, the resolution of which is limited only by the phonon noise of the detector bolometer.

A cell construction containing several bolometer elements is preferably implemented on a single uniform base, generally by utilizing known micro-machining techniques. Such a base typically has one or two normal metal layers and at least one superconducting layer. Thus the entire cell, in which there can thus be thousands of bolometer antennae and thus thousands of image elements, can be machined, for example, by growing on a single semiconductor base, for example, a silicon disc. It may therefore not be necessary to add any separate components to the camera element, but instead the detection electronics and reading electronics, and even the amplification electronics can be implemented on the same base as a very dense structure, i.e. so that the antennae are located very close to each other. Nevertheless, a very large surface area will be available for the detection of the signal, which is advantageous in terms of the sensitivity of the cell. It should be noted that a functional cell construction is created in the manner described, without switches or separate IC components. Niobium, for instance, is a superconductorthat is well suited as a manufacturing material of the bolometer.

According to a preferred embodiment, the construction formed in the manner described above is etched or otherwise thermally insulated in order to achieve thermal insulation between the bolometers and elements. In a camera it is also advantageous to insulate the cell structure thermally from the environment.

FIGS. 7a and 7b show a traditional bolometer antenna 710 and a superconducting wire bolometer 720, in a perspective view and at two different scales. The wire bolometer 720 is thermally insulated from the base with the aid of an air gap. As one skilled in the art will understand on the basis of the above description, the antenna and detector construction described is also suitable for application as a basis for the element according to the present invention and its embodiments.

The finished cell is connected electrically to the necessary control electronics and/or other electronics, as one skilled in the art will understand. In addition, cryogenics for cooling the cell will generally be required, and, particularly in camera applications, also millimeter optics between the focus of the detector surface of the cell, as well as image-processing electronics and/or software. In order to implement these, it is possible to use technical solutions that are already known or that have been developed for this purpose, as one skilled in the art will understand.

The invention permits the relatively economical manufacture of a highly sensitive camera, containing thousands of pixels, in the visible-light, Terahertz, or Gigahertz ranges, i.e. the sub-millimeter or infrared ranges (including the near, medium, and distant infrared range), for measuring the energy of individual photons or particles. Due to its sensitivity, the invention is particularly suitable for passive camera applications, for which there is a need, for example, as a means of detecting detrimental substances and objects in security checks. One important application of a bolometer camera is indeed its use, for example, the detection of firearms and explosives, for example, even through a person's clothing. Thus places where it can be used include, for example, airports, customs posts, ports, etc.

The invention claimed is:

1. Bolometer element comprising
a first bolometer having a first heating resistance for sensing radiation power directed at the element, and
conductors attached to the first bolometer, for detecting electrically the radiation power directed at the element,
a second bolometer having a second heating resistance, wherein the first and the second bolometers are electrically connected to each other in such a way that the heating resistance of the first bolometer can be biased with the aid of a voltage through the heating resistance of the second bolometer in order to amplify the radiation power detected with the aid of the connection.

2. Bolometer element according to claim 1, wherein the first bolometer is a bolometer exploiting a super transition.

3. Bolometer element according to claim 2, wherein the first bolometer is a transition-edge bolometer or an SIN-junction bolometer.

4. Bolometer element according to claim 1, wherein the second bolometer comprises a thermo-component having an electro-thermal transition point which is thermally connected to the second heating resistance, in order to regulate the temperature of the thermo-component with the aid of the power of the second heating resistance.

5. Bolometer element according to claim 4, wherein at the operating temperature the thermo-component is in a conductive state when the bias voltage is small or switched off, and can be brought to a resistive state at least partly with the aid of switching on the bias voltage.

6. Bolometer element according to claim 4, wherein the thermo-component having an electro-thermal transition point is a superconductor-based thermo-component.

7. Bolometer element according to claim 1, wherein the second bolometer is a transition-edge bolometer.

8. Bolometer element according to claim 1, wherein the second bolometer is an SIN-junction (superconductor—insulator—normal metal) bolometer.

9. Bolometer element according to claim 1, wherein at the operating temperature the first and the second heating resistances are of the same order of magnitude.

10. Bolometer element according to claim 9, wherein the second heating resistance is about 0.01-50% smaller that the first heating resistance.

11. Bolometer element according to claim 1, wherein at the operating temperature the thermal time constant of the second bolometer is sufficiently long to prevent foldover of the noise in the circuit.

12. Bolometer cell comprising several bolometer elements located in a one or two-dimensional matrix and conductors for detecting electrically from each bolometer element the radiation power acting on the bolometer elements, in which case each bolometer element comprises a first bolometer having a first heating resistance for sensing the radiation power acting on the element, wherein each bolometer element also comprises a second bolometer having a second heating resistance, wherein in each bolometer element the first and the second bolometers are connected to each other electrically in such a way that the heating resistance of the first bolometer can be biased with the aid of a voltage through the heating resistance of the second bolometer in order to amplify the radiation power detected with the aid of the circuit.

13. Bolometer cell according to claim 12, wherein each bolometer element comprises conductors attached to the first bolometer, for detecting electrically the radiation power directed at the element.

14. Bolometer cell according to claim 12, which comprises conductors for conducting the same bias voltage to each of the bolometer elements.

15. Bolometer cell according to claim 12, wherein the bolometer elements are arranged to form a matrix in rows and in columns, in which case each column is connected, or can be connected through a reading conductor to a current amplifier in such a way that all the bolometer elements of the column can be read with the aid of this current amplifier.

16. Bolometer cell according to claim 14, wherein each row comprises a row-selection conductor and the second bolometer of each bolometer element having an electro-thermal transition point, thus being superconductor-based.

17. Bolometer cell according to claim 16, wherein the second bolometers are connected to the row-selection conductor in such a way that they act as temperature-sensitive switches.

18. Bolometer cell according to claim 14, wherein the second bolometer of each bolometer element is an edge-transition bolometer and each row contains a row-selection conductor, through which the row in question can be selected, with the aid of current, using an amplifier for reading, by preheating the second bolometers of the row.

19. Bolometer cell according to claim 18, which is readable element by element with the aid of the said current amplifiers and row-selection conductors using time-multipexing.

20. Bolometer cell according to claim 19, wherein the bolometer elements are thermally insulated from each other on the base.

21. Bolometer cell according to claim 20, wherein the bolometer elements are thermally insulated from each other on the base by etching.

22. Bolometer cell according to claim 15, wherein the second bolometer of each bolometer element comprises an SIN junction, or similar, and each row contains a row selection conductor, through which the row in question can be selected, with the aid of current, using an amplifier for reading, in such a way that the SIN junction is brought close to its forbidden zone, the output of the current amplifier being proportional to the temperature of the SIN junction.

23. Bolometer cell according to claim 12, which is manufactured on a unified base, which comprises at least one superconducting layer and at least one metal layer.

24. Bolometer cell according to claim 23, which comprises two metal layers.

25. Bolometer cell according to claim 12, wherein the number of bolometer elements in the cell is at least 1×50.

26. Bolometer cell according to claim 25, wherein the number of bolometer elements in the cell is at least 50×50.

27. Bolometer cell according to claim 25, wherein the number of bolometer elements in the cell is at least 100×100.

28. Bolometer camera which comprises a bolometer cell according to claim 12.

29. Bolometer camera according to claim 28, wherein the bolometer cell comprises bolometer elements comprising an electro-thermal transition point, and the camera further comprises cryogenic means for cooling the bolometer cell to below the transition temperature of the bolometer elements contained in it.

30. Bolometer camera according to claim 28, which comprises a set of control and reading circuits for reading the bolometer cell with the aid of time-multiplexing.

31. Bolometer camera according to claim 28, which comprises millimeter or sub-millimeter-wave-range optical means for forwarding the radiation image directed from outside the camera to the elements of the bolometer cell, in order to detect the radiation image with the aid of the bolometer cell.

32. Method for reading a bolometer cell according to claim 12 with the aid of time-multiplexing, the bolometer elements of the bolometer cell being arranged as a matrix comprising several rows and several columns, in which each row comprises a row-selection conductor and each column a reading conductor connected to an amplifier, wherein when a bias voltage is switched on, each column is read element by element through the reading conductors simultaneously with the aid of current, in such a way that the elements are multiplexed in time row by row using the second bolometers of the elements as switches, which are opened and closed individually with the aid of a selection current or selection voltage directed to the row.

33. Method according to claim 32, wherein second bolometers are used, which possess an electro-thermal transition point, comprising a transition-edge bolometer, or an SIN junction, the reading exploiting a bias voltage and an increase in an energy state, of the second bolometers created by a selection current or a selection voltage, respectively.

34. Method for reading a bolometer cell according to claim 33, wherein the second bolometers are used, which are superconductor-based, comprising a transition-edge bolometer, or an SIN junction, the reading exploiting the bias voltage and an increase in an energy state, which is the temperature or voltage, of the second bolometers created by the selection current or the selection voltage, respectively.

35. Method according to claim 32, wherein the second bolometer of each element comprises a transition-edge bolometer, the heating resistances of which are connected in series by rows, and the elements to be read are selected by heating the transition-edge bolometers of the row in question with the aid of a selection current in such a way that they change from a superconducting state to a resistive sate, the radiation power acting on the corresponding first bolometers being detectable from the selected elements with the aid of amplifiers.

36. Method according to claim 32, wherein the second bolometer of each element comprises an SIN junction, which are connected in parallel by rows, the elements to be read being selected by bringing their SIN junctions close to their forbidden zone with the aid of a selection voltage in such a way that radiation power acting on the corresponding first bolometers is detected from the selected elements with the aid of amplifiers.

37. Method according to claim 32, wherein second bolometers are used, the thermal time constants of which are long, in order to avoid foldover of noise.

38. Method according to claim 32, wherein amplifiers are used, the effective noise of which reduced in the input is smaller than the square root of the ratio of the measuring time of one element to the measuring time times the noise in the output of the second bolometer.

* * * * *